United States Patent [19]
Kraus

[11] Patent Number: 4,576,055
[45] Date of Patent: Mar. 18, 1986

[54] HYDRAULICALLY CONTROLLED INFINITELY VARIABLE TRACTION ROLLER TRANSMISSION

[75] Inventor: Charles E. Kraus, Austin, Tex.

[73] Assignee: Excelermatic, Inc., Austin, Tex.

[21] Appl. No.: 641,046

[22] Filed: Aug. 15, 1984

[51] Int. Cl.$^4$ .................. F16H 15/08; F16H 15/00
[52] U.S. Cl. .................. 74/200; 74/190.5; 74/190
[58] Field of Search .................. 74/200, 190, 190.5, 74/199, 201

[56] References Cited

U.S. PATENT DOCUMENTS

| 4,086,820 | 5/1978 | Kraus et al. | 74/200 |
| 4,126,052 | 11/1978 | Jackman | 74/200 |
| 4,400,987 | 8/1983 | Kraus | 74/200 |
| 4,434,675 | 3/1984 | Kraus | 74/201 |
| 4,444,068 | 4/1964 | Kraus | 74/200 |
| 4,464,946 | 8/1984 | Kraus | 74/200 |
| 4,484,487 | 11/1984 | Kraus | 74/200 |

Primary Examiner—Lawrence J. Staab
Assistant Examiner—Michael D. Bednarek
Attorney, Agent, or Firm—Klaus J. Bach

[57] ABSTRACT

An infinitely variable traction roller transmission with traction rollers arranged between, and in engagement with, opposite toric discs for the transmission of motion therebetween includes traction roller support trunnions pivotally mounted in a transmission housing which has partially cylindrical housing cavities formed behind the trunnions, the trunnions having a hydraulic support structure including a seal plate having a curved face in engagement with the partially cylindrical housing and an opposite flat face adjacent a hydrostatic support cavity in said trunnions which permits friction-free sliding movement and pivoting of the trunnions for adjustment of the transmission ratio.

10 Claims, 4 Drawing Figures

HYDRAULICALLY CONTROLLED INFINITELY VARIABLE TRACTION ROLLER TRANSMISSION

BACKGROUND OF THE INVENTION

The invention relates to an infinitely variable traction roller transmission in which power is transmitted through traction rollers pivotally supported in a housing between toric input and output discs.

In such transmissions, the traction rollers are mounted on support structures which, when pivoted, cause engagement of the traction rollers with the toric discs in circles of varying diameters depending on the desired transmission ratio. The pivotal traction roller support structures are so mounted that they can be moved axially for initiating a change in the transmission ratio. This is accomplished for example by flexible tension sheets as shown in U.S. Pat. No. 4,086,820 which issued May 2, 1978 to Charles E. Kraus.

However, the forces applied to the traction rollers and, through the traction roller support structure, to the tension sheets are substantial and, consequently require support structure of great strength together with adequate pivot bearings therefor. Also, the transmission is not always free of vibrations and these vibrations are transmitted from the traction rollers to the traction roller support structures and their bearings and finally to the transmission housing.

Also, hydraulic support arrangements are known for supporting the traction rollers which arrangements reduce the bearing loads.

SUMMARY OF THE INVENTION

In order to firmly support the traction rollers and the traction roller support structures in a simple and inexpensive manner and essentially free from vibrations, an infinitely variable traction roller transmission with traction rollers arranged between, and in engagement with, opposite toric discs includes traction roller support trunnions with pressurized fluid receiving cavities formed thereon opposite the traction rollers and adjacent the walls of partially cylindrical support cavities formed in the housing and having centers of curvature coinciding with the pivot axis of the respective support trunnion. A seal plate is disposed between the trunnions and the housing and is shaped to sealingly abut the housing whereas its other side adjacent the trunnion is flat so as to permit relative floating movement of the trunnion thereon. Pressurized fluid supplied to the support cavities directly supports the traction roller support trunnions without transmitting vibrations from the traction rollers to the housing. Being evenly supported the trunnions are not subject to bending stresses and, floating on the pressurized fluid, they are easily pivotable even when large torques are transmitted through the transmission and large contact forces are applied to the contact areas between the traction rollers and the toric discs.

SHORT DESCRIPTION OF THE DRAWINGS

DESCRIPTION OF THE PREFERRED EMBODIMENT

Figure 1:
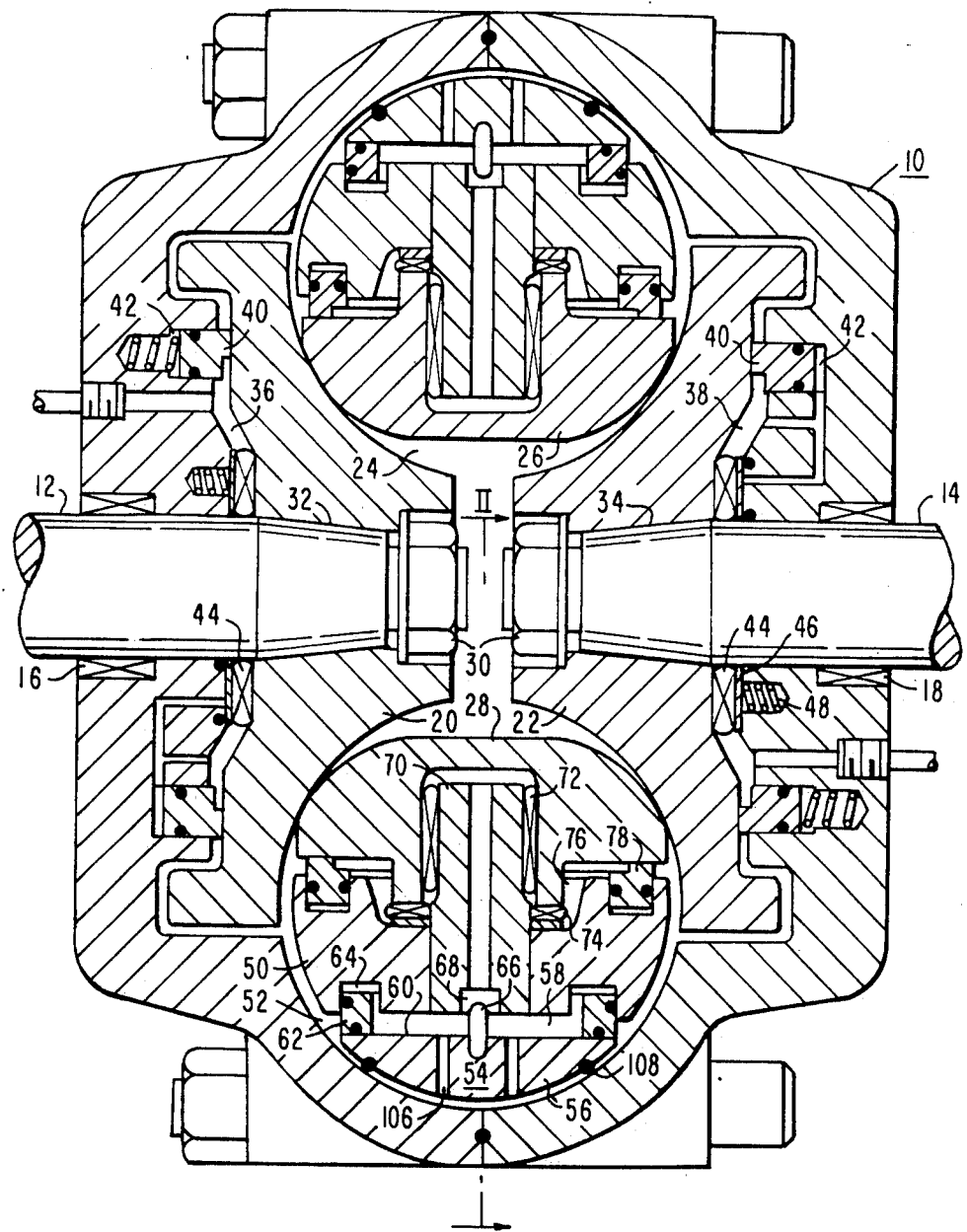
FIG. 1 is an axial cross-sectional view of the traction roller transmission.

A traction roller transmission as shown in FIG. 1 consists of a housing 10 having coaxial input and output shafts 12 and 14 rotatably supported therein by bearings 16 and 18. Associated with the input and output shafts 12 and 14 are toric traction discs 20 and 22 so arranged opposite each other that a toric cavity 24 of circular axial cross-section is defined therebetween. Within the toric cavity 24 traction rollers 26, 28 are rotatably supported and are in engagement with the toric traction discs 20 and 22 for the transmission of motion between the discs 20, 22.

The toric traction discs 20 and 22 are mounted on the ends of shafts 12 and 14 by nuts 30 and they are seated on cones 32 and 34. Axial support is provided for the traction discs 20 and 22 by axial thrust bearing structures 36 and 38. Each axial thrust bearing structure includes an antifriction bearing or a hydrostatic bearing comprising the area within a limited leakage seal ring 40 which is axially slidably disposed within an annular seal ring cavity 42 and a mechanical axial thrust bearing 44 which provides for minimum bearing support to avoid damage during start-up operation when insufficiently pressurized fluid is supplied to the hydrostatic axial thrust bearing. The mechanical bearing 44 abuts an axially movable bearing ring 46 with a spring 48 disposed behind it so as to provide always a degree of minimum engagement between the toric discs 20 and 22 and the traction rollers 26 and 28.

The traction rollers 26 and 28 are rotatably supported on a pivot trunnion structure 50 which permits pivoting of the traction rollers about axes normal to a plane including the input and output shaft axis to provide for engagement of the traction rollers 26 and 28 with the surface of the toric discs 20 and 22 at circles of different diameters for the adjustment of various power transmission ratios between the input and output shafts 12 and 14.

For the support of the trunnion structures 50, the housing 10 has a semicylindrical cavity 52 into which a hydrostatic trunnion back-up structure 54 extends. The trunnion back-up structure 54 includes a seal plate 56 defining a trunnion cavity 58 adapted to be pressurized by hydraulic fluid for supporting the trunnion. The seal plate 56 has a flat surface 60 adjacent the trunnion 50 and a seal strip 62 is disposed in a groove 64 in the trunnion 50 and abuts the flat surface 60 to seal the cavity 58. A pin 66 extending into an opening 68 in the roller support stud 70 mounted in the trunnion 50 limits the movement of the trunnion 50 relative to the seal plate 56. The traction roller 28 is supported on the stud 70 by a bearing 72 and on the trunnion by a mechanical bearing 74 but, during operation, mainly by the pressurized fluid within the cavity 76 defined by the limited leakage bearing ring 78.

The operation of such toric traction roller transmission is generally known. It is to be noted, however, that with the arrangement according to the present invention, the traction rollers and also the trunnions are fully hydraulically supported, at least during operation of the transmission when pressurized lubricant is supplied. Slight bending of the trunnion is permitted without disturbing the trunnion cavity seal with the semicylindrical housing section.

Figure 2:
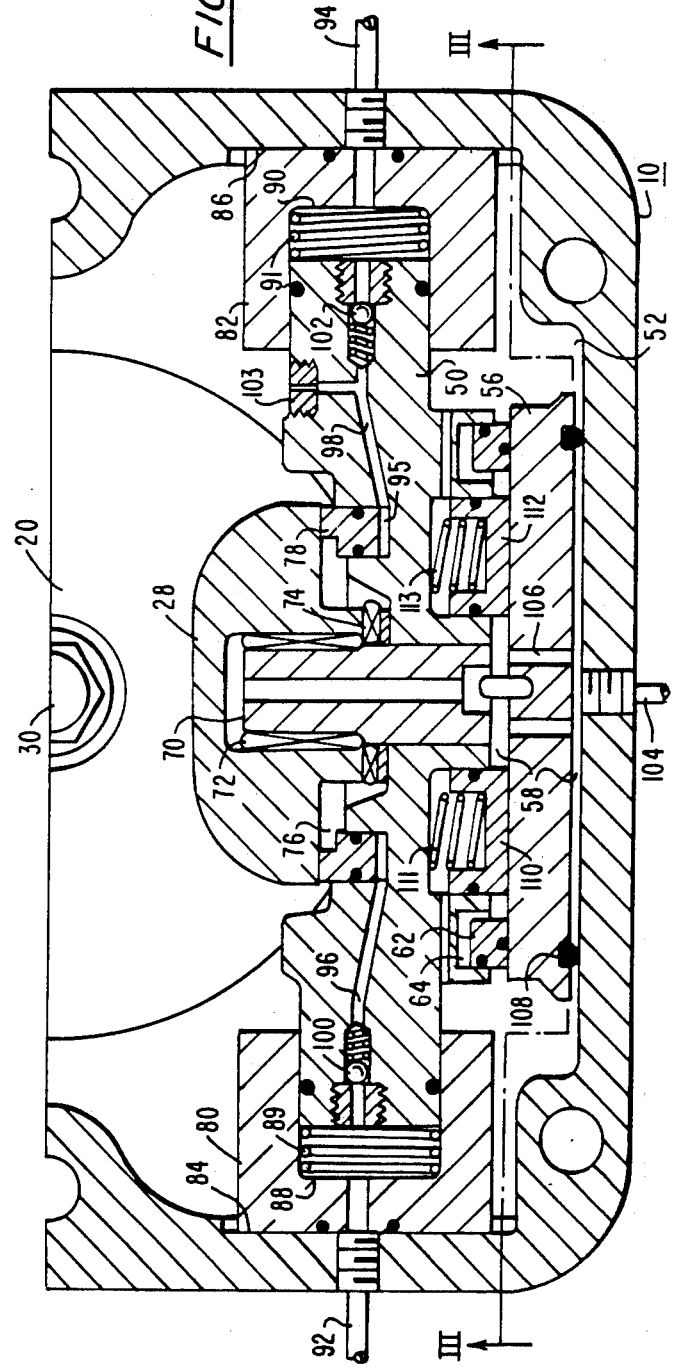
FIG. 2 is a cross-sectional view along line II—II of FIG. 1.

FIG. 2 shows the trunnion arrangement in greater detail. It shows, furthermore, the ends 51 and 53 of the trunnion 50 slidably supported in cylinders 80, 82 which abut flat surface areas 84, 86 of the housing 10 on which limited sliding of the support cylinders 80, 82 is permitted. Ratio control fluid is supplied to the cavities 88, 90 of the cylinders 80, 82 through supply lines 92, 94 so as to axially position the trunnion depending on the desired transmission ratio change. In the embodiment as shown in FIG. 2, each of the cylinder cavities 88, 90 is in communication with the area 95 under the seal ring 78 by means of bores 96 and 98, which bores are provided with check valves 100, 102 so as to provide pressurized fluid to the area 95 from that cylinder cavity 88 or 90 which carries the higher fluid pressure. A bleed passage 103 slowly releases fluid so as to relieve pressure when the pressure in the cavities 88 or 90 falls. The trunnion seal cavity 58 receives pressurized fluid through supply line 104 and passages 106 in the seal plate 56.

Figure 3:
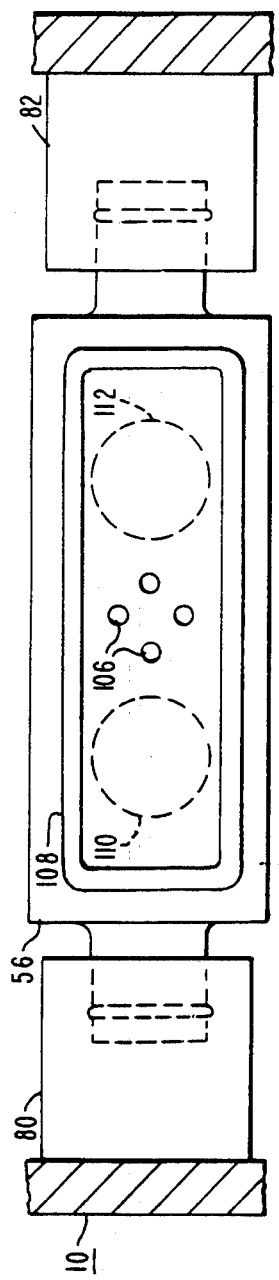
FIG. 3 is a view of the seal plate with trunnion along line III—III of FIG. 2.

The seal plate 56 is elongate and is curved on one side like the semicylindrical housing section. It carries a seal strip 108 which extends around the elongate seal plate 56 as seen in FIG. 3.

Preferably, there are provided spring loaded preload plungers 110 and 112 which force the seal plate 56 into engagement with the housing walls to prevent the loss of pressurizing lubricant at the beginning of transmission operation. To engage the pistons 80 and 82 with the housing 10, springs 89 and 91 may be disposed in the cylinder cavities 88 and 90.

Concerning the operation of the transmission, reference is made to applicant's earlier application Serial No. 455,121 filed Jan. 3, 1983. In the arrangement according to the present invention, however, the trunnions 50 are fully hydraulically supported and yet they are not only pivotal but also somewhat movable normal to their axes. Axially the trunnions are supported in the cylinders 80 and 82 which slidably abut the housing 10, so that the trunnions are floatingly supported under control of the pressure of the hydraulic fluid supplied to the various pressurized fluid cavities.

The arrangement according to the invention provides for a very simple, easily controllable traction roller transmission of simple components which are easy to manufacture. The seal plate 56 is flat on one side and partially cylindrical on the other. Preferably, its hydrostatic bearing area is larger than the roller's hydrostatic bearing area so that the antifriction axial thrust bearing 74 of the traction roller 28 is utilized during operation to share some of the traction roller axial thrust load. This prevents hydrostatic ring flutter which would tend to allow some of the lubricant to escape from the hydrostatic bearing cavity 79 under traction roller 28.

The plungers 110 and 112 are preferably so loaded by the springs 111 and 113 that pivoting of the trunnion is somewhat inhibited if it is desired that the trunnion retain a certain transmission ratio pivot position during shutdown, or before sufficiently pressurized control fluid is available. Their area and springs 111, 113 may be so chosen and/or bleed passages may be provided as to allow them to be pushed back from contact with the seal plate 56 when the lubricant is sufficiently pressurized. They could re-engage the seal plate 56 at high speed-up ratios when traction decreases and lubricant pressure is relatively low to add load to the traction roller for better engagement thereof with the toric discs.

Figure 4:
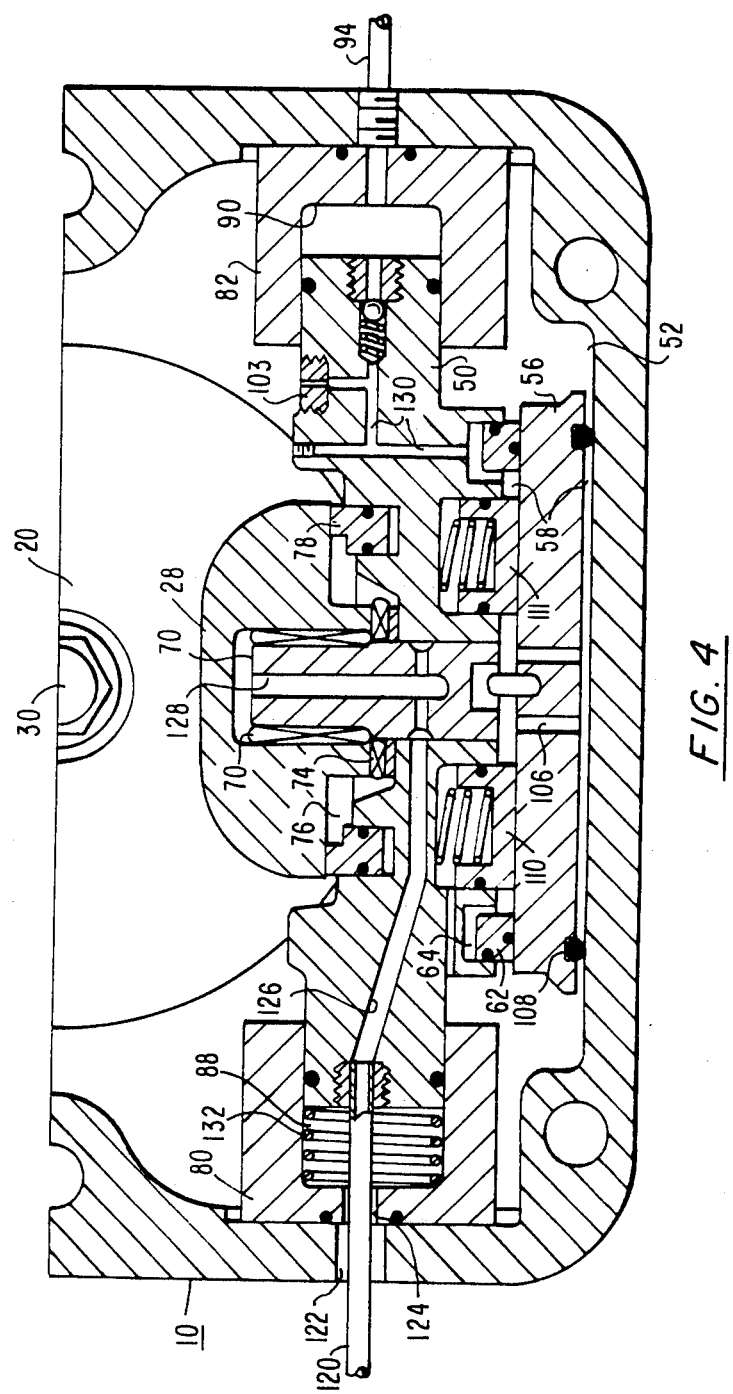
FIG. 4 shows an embodiment similar to that shown in FIG. 2.

FIG. 4 shows an arrangement essentially in accordance with that described with reference to FIG. 2. Here, however, the pressurized lubricant for the hydrostatic axial thrust bearing cavity 76 of each traction roller is supplied separately through supply duct 120 passing through an opening 122 in the housing 10 and an opening 124 in the cylinder 80. Trunnion bore 126 supplies the pressurized fluid to the stud 70 and through its central bore 128 to the cavity 76 of the hydrostatic axial thrust bearing 74 of roller 28, which bearing is described in detail in U.S. Pat. No. 4,333,692. In this arrangement, a measured volume of lubricant is supplied to the axial thrust bearings to develop therein whatever pressure is necessary to maintain a certain axial position so that variations in seal performance will not unbalance the roller forces. The hydrostatic bearing cavities 58 of opposite sides of the seal plate 56 are pressurized with lubricant supplied from cylinder cavity 90 through passage 130. The pressurized control fluid in cavity 90 controls the axial trunnion position against the force of spring 132 in the cylinder 80.

With the arrangement according to the invention, binding of the trunnion when it moves off the housing cavity center of curvature no longer occurs. The trunnions can be aluminum or die castings as they are not exposed to high loads. There are no expensive antifriction bearings needed, and the whole drive is smaller, lighter, more efficient and can carry a higher load than comparable prior drives.

I claim:

1. An infinitely variable traction roller transmission comprising a housing, coaxial, input and output shafts rotatably supported in said housing; two toric discs supported opposite each other, one by said input and the other by said output shaft; said toric discs having opposite toric surfaces defining therebetween a toric cavity of circular cross-section, at least two motion transmitting traction rollers disposed between, and in engagement with, said toric discs for the transmission of motion therebetween; each of said traction rollers being rotatably supported by trunnions retained in said housing pivotally about pivot axes so as to permit changing of the ratio of motion transmission between said input and output toric discs, said housing having a partially cylindrical wall forming a support cavity adjacent each trunnion and having a center of curvature coinciding essentially with the pivot axis of the adjacent trunnion, and a seal plate disposed in said support cavity adjacent said trunnion, said seal plate having on one side a first fluid cavity defined by a partially cylindrical seal area in sealing engagement with said partically cylindrical housing wall and, on the other side, a flat sealing area engaged by a trunnion seal defining a second fluid cavity, so as to seal said trunnion relative to said seal plate while permitting relative movement between said trunnion and said seal plate; and means for admitting pressurized fluid to said support cavity.

2. A traction roller according to claim 1, wherein fluid passages extend through said seal plate so as to provide for the same fluid pressure at both sides thereof and the cross-section of the first fluid cavity between said partially cylindrical housing section and said seal plate is slightly smaller than the cross-section of the second fluid cavity between said seal plate and said trunnion so as to force the seal plate into engagement with said partially cylindrical wall section.

3. A traction roller transmission according to claim 2, wherein each of said traction rollers is provided with a mechanical axial thrust bearing, but is mainly supported by a hydrostatic axial thrust bearing structure supplied with pressurized fluid of the same pressure as that in the fluid cavities adjacent said seal plate, the cross-section of said hydrostatic axial thrust bearing being smaller than the cross-section of the second fluid cavity between said seal plate and said trunnion thereby to prevent lift off of said traction roller from said mechanical axial thrust bearing.

4. A traction roller transmission according to claim 1, wherein spring loaded plungers are movably so disposed in said trunnions as to engage said seal plate and force it into abutment with said partially cylindrical housing wall to thereby insure sealing engagement of said seal plate with said partially cylindrical housing wall when pressurized fluid is not available.

5. A traction roller transmission according to claim 1, wherein each of said trunnions has its opposite ends slidingly received in cylinders which have flat face areas normal to the trunnion axis and the transmission housing has flat surface areas engaged by said cylinders for slidably supporting said cylinders.

6. A traction roller transmission according to claim 5, wherein a circular seal is disposed between said cylinders and the flat surface areas of said housing and control fluid supply passages extend through said housing and through said cylinders into the area surrounded by said circular cylinder seals so as to provide control fluid passage means for supplying control fluid to the interior of said cylinders.

7. A traction roller transmission according to claim 5, wherein springs are disposed in said cylinders so as to abut the ends of said trunnions for biasing the cylinders into engagement with the flat surface areas of said housing.

8. A traction roller transmission according to claim 5, wherein each traction roller is supported by hydrostatic axial thrust bearings defined by a limited leakage bearing seal ring movable within a seal ring cavity in the trunnion, wherein bores extend from each end of said trunnion to said seal ring cavity, each of said bores having a check valve disposed therein thereby to cause pressurization of said seal ring cavity with fluid from the cylinder with the higher pressure fluid, and wherein a bleed opening is provided so as to slowly release fluid from said seal ring cavity.

9. A traction roller transmission according to claim 5, wherein each traction roller is supported by hydrostatic axial thrust bearings defined by a limited leakage bearing seal ring, wherein a pressurized fluid bore extends through one of the trunnion ends to said axial thrust bearings to supplying pressurized fluid thereto and another bore extends from the other trunnion end to said trunnion support cavity so as to supply pressurized fluid from the cylinder cavity at said other trunnion end to said trunnion support cavity.

10. A traction roller transmission according to claim 9, wherein a balancing spring is disposed in the cylinder at said one trunnion end, the pressurized fluid admitted to the cylinder at the other trunnion end being adapted to axially position said trunnion against the force of said balancing spring.

* * * * *